US010828738B2

(12) United States Patent
Stokley (10) Patent No.: US 10,828,738 B2
(45) Date of Patent: Nov. 10, 2020

(54) MILLING MACHINE

(71) Applicant: Grant Prideco, L.P., Houston, TX (US)

(72) Inventor: Edgar M. Stokley, Montgomery, TX (US)

(73) Assignee: Grant Prideco, L.P., Houston, TX (US)

( * ) Notice: Subject to any disclaimer, the term of this patent is extended or adjusted under 35 U.S.C. 154(b) by 9 days.

(21) Appl. No.: 16/314,880

(22) PCT Filed: Jul. 20, 2017

(86) PCT No.: PCT/US2017/043135
§ 371 (c)(1),
(2) Date: Jan. 3, 2019

(87) PCT Pub. No.: WO2018/017869
PCT Pub. Date: Jan. 25, 2018

(65) Prior Publication Data
US 2019/0224796 A1    Jul. 25, 2019

Related U.S. Application Data

(60) Provisional application No. 62/364,672, filed on Jul. 20, 2016.

(51) Int. Cl.
*B23Q 7/05* (2006.01)
*B23C 3/10* (2006.01)
(Continued)

(52) U.S. Cl.
CPC .................. *B23Q 7/05* (2013.01); *B23C 3/10* (2013.01); *B23Q 3/064* (2013.01); *B23Q 3/066* (2013.01);
(Continued)

(58) Field of Classification Search
CPC .. B23C 1/20; B23C 3/002; B23C 3/02; B23C 2215/64; B23C 2270/08; B23Q 3/064;
(Continued)

(56) References Cited

U.S. PATENT DOCUMENTS 2,625,861 A * 1/1953 Leonard .................. B23Q 3/06
269/157
3,613,983 A * 10/1971 Gage ..................... B23K 20/121
228/2.3
(Continued)

FOREIGN PATENT DOCUMENTS

CN    202411848 U    9/2012
FR    2792864 B1    6/2001

OTHER PUBLICATIONS

PCT/US2017/043135 International Search Report and Written Opinion dated Sep. 29, 2017 (9 p.).

*Primary Examiner* — Alan Snyder
(74) *Attorney, Agent, or Firm* — Conley Rose, P.C.

(57) ABSTRACT

A portable and field-adjustable milling machine comprises: a base; a milling assembly coupled to the base and that includes a milling tool rotatable by a driver; a roller bed coupled to the base and configured to support a tubular member thereon; and a vice assembly that is coupled to the base. Each vice member of the vice assembly is configured to be moved towards the other of the pair and includes camming surfaces configured to lift the tubular member off of the roller bed in response to the vice members being moved toward one another. The vice member may have a v-shaped notch defined by a pair of angled surfaces. The vice assembly lifts the tubular member and retains it in the notch at a position that is a predetermined distance away from the roller bed.

20 Claims, 11 Drawing Sheets

(51) Int. Cl.
 *B23Q 3/06* (2006.01)
 *B23Q 3/18* (2006.01)
 *B23Q 5/34* (2006.01)
 *B23Q 3/10* (2006.01)

(52) U.S. Cl.
 CPC ............ *B23Q 3/104* (2013.01); *B23Q 3/183* (2013.01); *B23Q 5/347* (2013.01); *B23C 2215/64* (2013.01); *B23Q 2240/007* (2013.01)

(58) Field of Classification Search
 CPC .......... B23Q 3/066; B23Q 3/06; B23Q 3/104; B23Q 3/183; B23Q 7/05; B23Q 2240/007
 See application file for complete search history.

(56) References Cited

U.S. PATENT DOCUMENTS

| | | | |
|---|---|---|---|
| 4,706,948 A | | 11/1987 | Kroecher |
| 6,231,036 B1 * | | 5/2001 | Johnson .................. B23C 3/002 198/345.1 |
| 9,744,634 B2 * | | 8/2017 | Plank ...................... B23Q 3/104 |
| 2002/0060386 A1 * | | 5/2002 | Konieczny ............. B23C 3/002 269/56 |
| 2005/0022353 A1 | | 2/2005 | Viola et al. |
| 2010/0170081 A1 * | | 7/2010 | Kuroda .................. B23Q 3/066 29/559 |
| 2011/0272872 A1 * | | 11/2011 | Stadtfeld ................ B23F 23/06 269/61 |
| 2012/0103472 A1 * | | 5/2012 | Lachance ............. B21D 28/243 144/371 |
| 2014/0230229 A1 | | 8/2014 | Dixson et al. |

\* cited by examiner

MILLING MACHINE

CROSS-REFERENCE TO RELATED APPLICATIONS

This application is a 35 U.S.C. § 371 national stage application of PCT/US2017/04135 filed Jul. 20, 2017, and entitled "Milling Machine," which claims benefit of U.S. provisional patent application Ser. No. 62/364,672, filed Jul. 20, 2016, and entitled "Milling Machine," each of which is hereby incorporated herein by reference in their entirety for all purposes.

STATEMENT REGARDING FEDERALLY SPONSORED RESEARCH OR DEVELOPMENT

Not applicable.

BACKGROUND

This disclosure generally relates to tools and devices for machining pockets or recesses into a downhole tubular. More particularly, this disclosure relates to a portable milling machine suitable for field use on uneven terrain that can be employed to form pockets or recesses having a planar surface into a cylindrical surface of a downhole tubular.

In oil and gas drilling and/or production operations, planar surfaces for placement of devices or tags providing identification information are typically machined on a downhole tubular (e.g., pipes, downhole tools, etc.). Identification tags (e.g., radio frequency identification or "RFID" tags) may be secured to the planar surface and utilized in tracking the tubular both at the work site (or storage site) and within a subterranean wellbore. In a tubular member, an RFID tag is commonly placed on a planar surface of a recess that has been formed and that extends radially into the tubular member. Machining these pockets or recesses on a downhole tubular is typically carried out with a computer numeric control (CNC) machine.

SUMMARY OF THE DISCLOSURE

A highly portable and field-adjustable milling machine is disclosed that comprises: a supporting base; a milling assembly coupled to the base and that includes a milling tool rotatable by a driver; a roller bed coupled to the base and configured to support a tubular member thereon; and a vice assembly that is coupled to the base and includes a pair of vice members. Each vice member is configured to be moved towards the other of the pair and includes camming surfaces configured to lift the tubular member off of the roller bed in response to the vice members being moved toward one another.

In an embodiment, the vice members comprise a v-shaped notch defined by a pair of angled surfaces. The vice assembly may be configured to lift the tubular member and retain it at a position that is at a predetermined distance away from the roller bed. In some embodiments, the milling machine includes a vice assembly configured to lift any tubular member having an OD of 2⅜ inches to 11 inches to the predetermined position.

In some embodiments, the vice assembly is configured to lift any tubular member having an OD of 4.5 inches to 11 inches to the predetermined position away from the roller bed, with each vice member of the pair having an elbow spaced apart from the notch, and wherein the elbow is not greater than 2¼ inches from the roller bed.

In some embodiments, the milling machine further comprises a shoe coupled to each vice member, the shoe comprising a camming surface that extends to a position that is closer to the rollers than the camming surfaces of the vice members.

In some embodiments, the milling machine further includes a plurality of hollow lifting members, such as tubular members, coupled to the base, where the lifting members extend at least half of the width of the base and including a receptacle that is configured to receive an elongate appendage of a lifting device, such as a forklift.

In some embodiments, the milling machine includes a plurality of legs that are configured to support the base, wherein each of the legs has a length that is individually adjustable relative to the other legs.

In some embodiments, the milling machine includes a frame that is configured to traverse along the base in a first direction, and in some instances, the milling assembly includes a sub-frame configured to support the milling tool, wherein the sub-frame is movably coupled to the frame such that the sub-frame may traverse relative to the frame along a second direction that is orthogonal to the first direction.

Also disclosed is a method of machining a pocket in a surface of a tubular member that comprises: placing a tubular member in contact with a plurality of rollers on a roller bed that is supported on the base of a milling machine; moving towards one another a pair of vice members that are coupled to the base, wherein each of the vice members include a notch formed by the intersection of two angled surfaces. As the vice members are moving towards one another, the method includes causing an angled surface of each of the vice members to engage the tubular member and lift the tubular member off of the rollers. The method also includes capturing the tubular member and retaining it at a predetermined distance from the roller bed and, after capturing the tubular member, machining a pocket in the tubular member with a milling tool supported from the base.

In some embodiments, the method includes, prior to moving the pair of vice members towards one another, attaching to each of the vice members a shoe, the shoe comprising a camming surface that extends to a position that is closer to the rollers than the angled surfaces of the vice members.

In some embodiments, the method includes, prior to placing the tubular member on the roller bed, leveling the base by adjusting the length of legs that are coupled to the base.

Further, in some embodiments, the method includes, prior to leveling the base, positioning appendages of a lifting device within a plurality of hollow lifting members that are coupled to the base, and lifting the milling machine using the appendages.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via the interconnection of other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, a CNC machine is typically used to machine flat surfaces or recesses onto or into a surface of a downhole tubular. These sorts of devices typically must be operated in a clean environment, such as a shop or other suitable location, and must be operated on a level surface (e.g., the floor of a machine shop). Further, such CNC machines are typically not readily transportable such that they are not moved and operated at the operations site (e.g., the drill site, well site, pipe storage facility, etc.). Therefore, embodiments disclosed herein are directed to a portable milling machine configured to machine both planar surfaces and/or threaded recesses in a downhole tubular (e.g., drill pipe, casing pipe, drill collar, tubing, etc.). The disclosed embodiments are configured to be readily transportable, and may be operated in any environment, including, for example, a pipe storage facility (e.g., pipe yard), an operational site (e.g., drill site, work site, etc.), a machine shop or other controlled environment.

Figure 1:
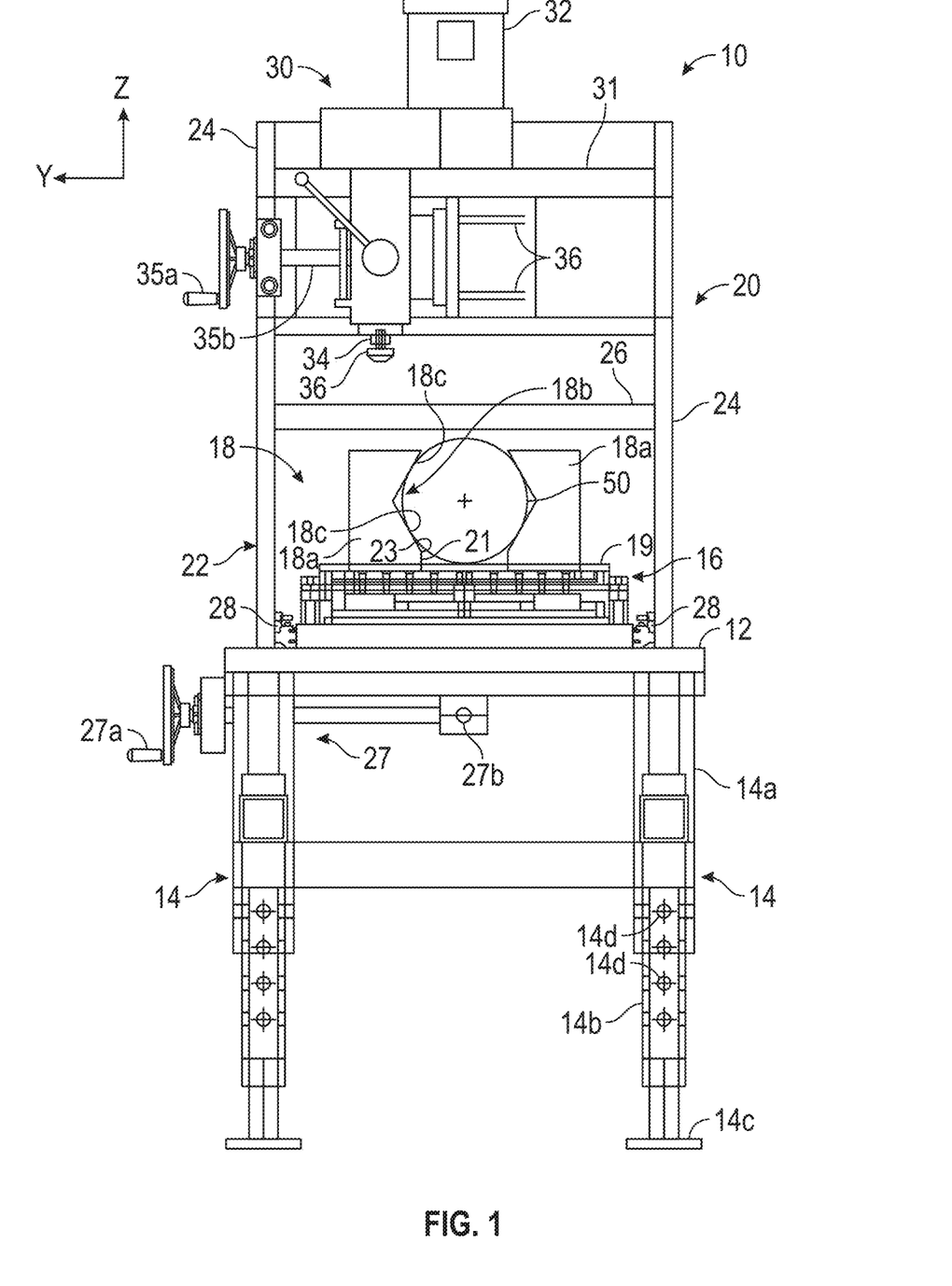
FIG. 1 is a front schematic view of a milling machine having a pipe-centering and lifting vice assembly in accordance with at least some embodiments disclosed herein.
Figure 2:
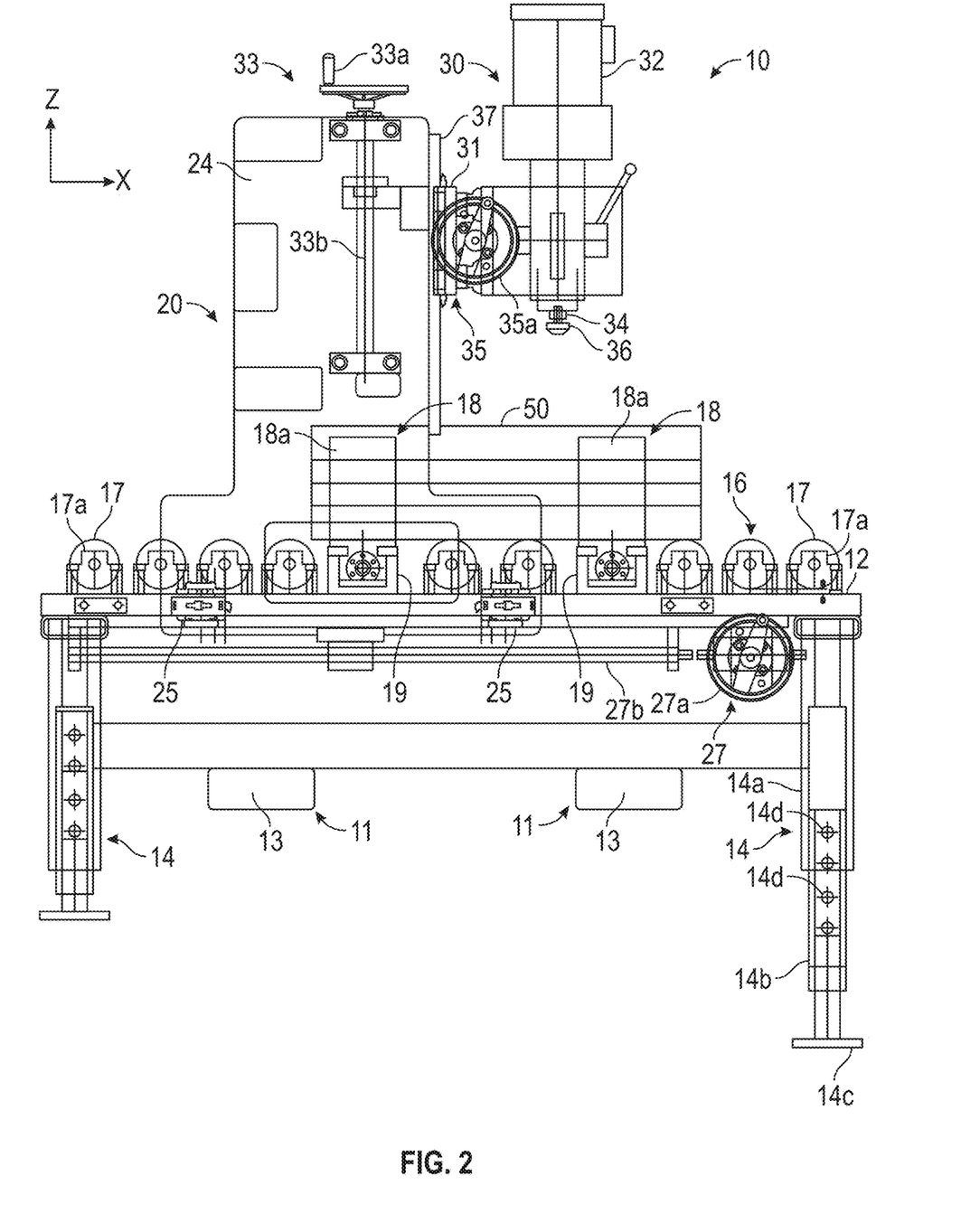
FIG. 2 is a side schematic view of the milling machine of FIG. 1.

Referring now to FIGS. 1 and 2, an embodiment of a milling machine 10 is shown. In FIGS. 1 and 2, for purposes of clarity the relative directions of components and/or their potential movements will be described in terms of the X, Y, and Z axis directions shown therein. As shown in FIGS. 1 and 2, milling machine includes a base 12 (also referred to herein as table 12)), a plurality of support legs 14 extending downward (i.e., along the Z axis direction) from table 12, a roller bed 16 mounted atop the table 12, a pair of alignment vice assemblies 18 also mounted atop table 12, and a milling assembly 20 coupled to the table 12.

Support legs 14 each include a first or outer member 14a that is mounted to the underside of table 12 and a telescoping inner member 14b that is slidably disposed within outer member 14a. During set up, inner member 14b may telescope in and out of outer member 14a to adjust the overall length of leg 14. The lowest or most distal end of inner member 14b includes a foot or engagement member 14c that, in this embodiment, comprises a rectangular plate. During set up, the foot 14c engages with a support surface (e.g., the floor, ground, etc.) to transfer some portion of weight of the milling machine 10 into the support surface. In this embodiment, the desired length of each leg 14 may be adjusted by telescoping the inner member 14b relative to the outer member 14a (e.g., along the Z axis direction) and then locking or securing the leg 14 at the desired length by aligning one of the alignment apertures 14d extending through inner member 14b with a corresponding aperture in outer member 14a and inserting a bolt or other suitable locking member through the aligned apertures. Thus, through adjustment of the length of each of the legs 14, table 12 may be leveled regardless of the levelness or character of the ground or other surface on which the milling machine 10 will be set up and operated. As a result, the milling machine 10 may be utilized successfully in environments outside of a machine shop (e.g., at a pipe storage facility, work site, drill site, well site, etc.) an on uneven ground.

As best shown in FIG. 2, milling machine 10 includes a pair of lifting members 11 coupled to table 12. Each of the lifting members 11 is substantially hollow and defines a receptacle 13 for receiving an appendage of a separate lifting device (not shown), such as the lifting forks or prongs of a forklift. In this embodiment, lifting members 11 are elongate and may extend from half the way to all the way or substantially all the way from one side of base 12 to the other. In at least one embodiment, the lifting members are tubular, rectangular in cross section, and extend across the entire width of the base, such as in the Y direction as shown in FIG. 2, Also in this embodiment, receptacles 13 are rectangular in shape and are configured to receive the fork members of a forklift or similar lifting device. As a result, milling machine 10 may be easily and readily lifted and transported via a transportation device (e.g., a forklift). Without being limited to this or any other theory, because the receptacles 13 fully receive an appendage of a lifting device (not shown), there is a reduced risk that milling machine will slide off the lifting device during a lifting and/or transportation operation.

Roller bed 16 includes a plurality of rollers 17 extending width-wise across table 12 (i.e., each of the rollers 17 extend along the Y axis direction). As is best shown in FIG. 2, each roller 17 is mounted within a holder 17a such that each roller 17 may rotate about a corresponding axis that is oriented parallel with the Y axis direction relative to holder 17a as may be appreciated in FIG. 2. The rollers 17 may include one or more bearings (not shown) to facilitate their rotation within holder 17a. Holders 17a may be mounted (e.g., bolted) to table 12 or may be mounted to some other structure, which is in turn mounted to table 12.

Figure 6:
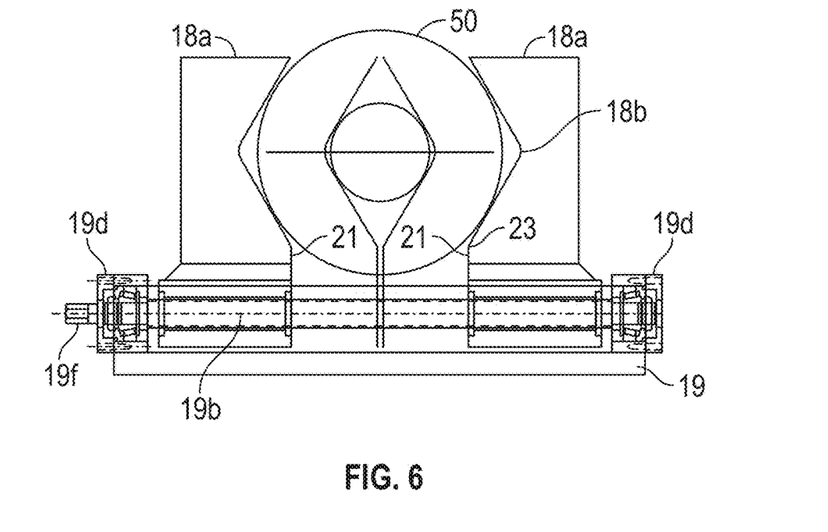
FIGS. 6-8 are, respectively, front, side and top views of the vice members shown in FIG. 5.
Figure 7:
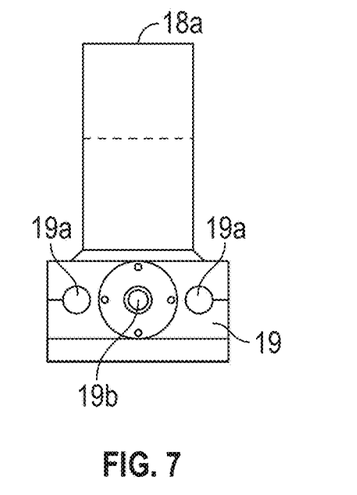
Figure 8:
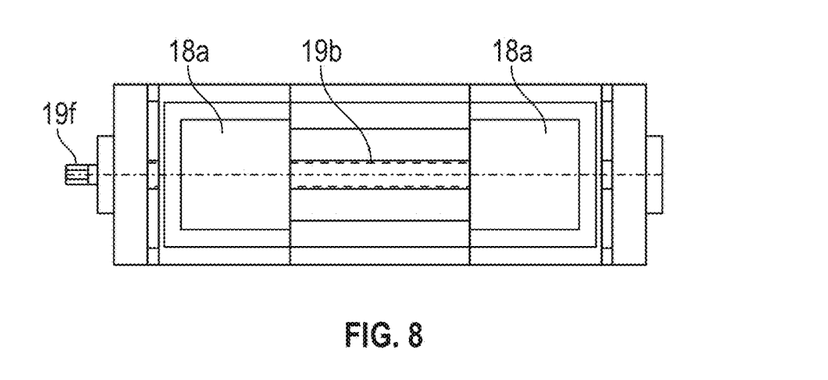

Each alignment vice assembly 18 includes a pair of vice members 18a that are each movably disposed on a corresponding track assembly 19. In this embodiment, the pair of vice members 18a of each alignment vice assembly 18 are movable along the corresponding track assembly 19 in the Y axis direction shown in FIG. 1. For example, in some embodiments, each alignment vice assembly 18 may include a manual, hydraulic, electrical, mechanical, or other actuator (e.g., hand crank, hydraulic cylinder, electric motor, etc.) that is configured to actuate the vice members 18a toward and apart from one another in the Y axis direction specified in FIG. 1. As best shown in FIGS. 6-8, each pair of vice members 18a is mounted in a track 19 on rails 19a and a screw 19b, which is supported at each end by bearing assemblies 19d. A hand crank (not shown) is coupled to one end 19f of screw 19b and used to move each vice member 18a of a given pair toward or apart from one another. Each vice member 18a includes a v-shaped notch 18b formed by a pair of opposed angled surfaces 18c. In this embodiment, configured to receive and secure tubulars in a very wide range of OD's, the angle between the angled surfaces 18c of each vice member 18a is approximately 120°; however, other angles are possible in other embodiments. Each vice member 18a further includes a lower surface 21 that is below angled surfaces 18c and that, in this embodiment, is generally perpendicular to roller bed 16 and table 12. Surface 21 intersects the lowermost angled surface 18c forming elbow 23. As best shown in FIG. 2, in this embodiment, milling machine 10 includes a total of two vice assemblies 18 that are spaced apart from one another along the X axis direction.

Figure 3:
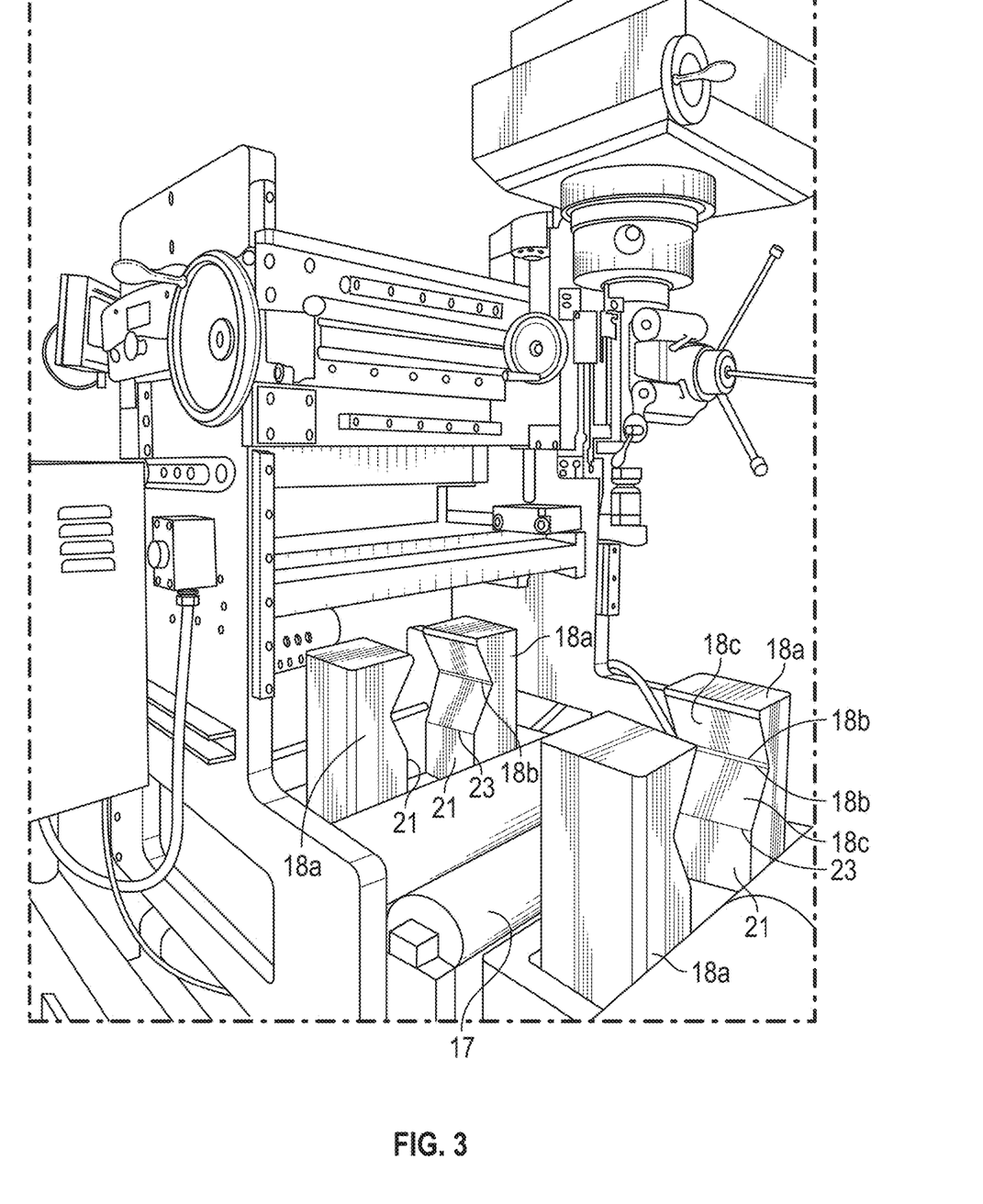
FIG. 3 is a perspective view of the milling machine of FIG. 1.
Figure 4:
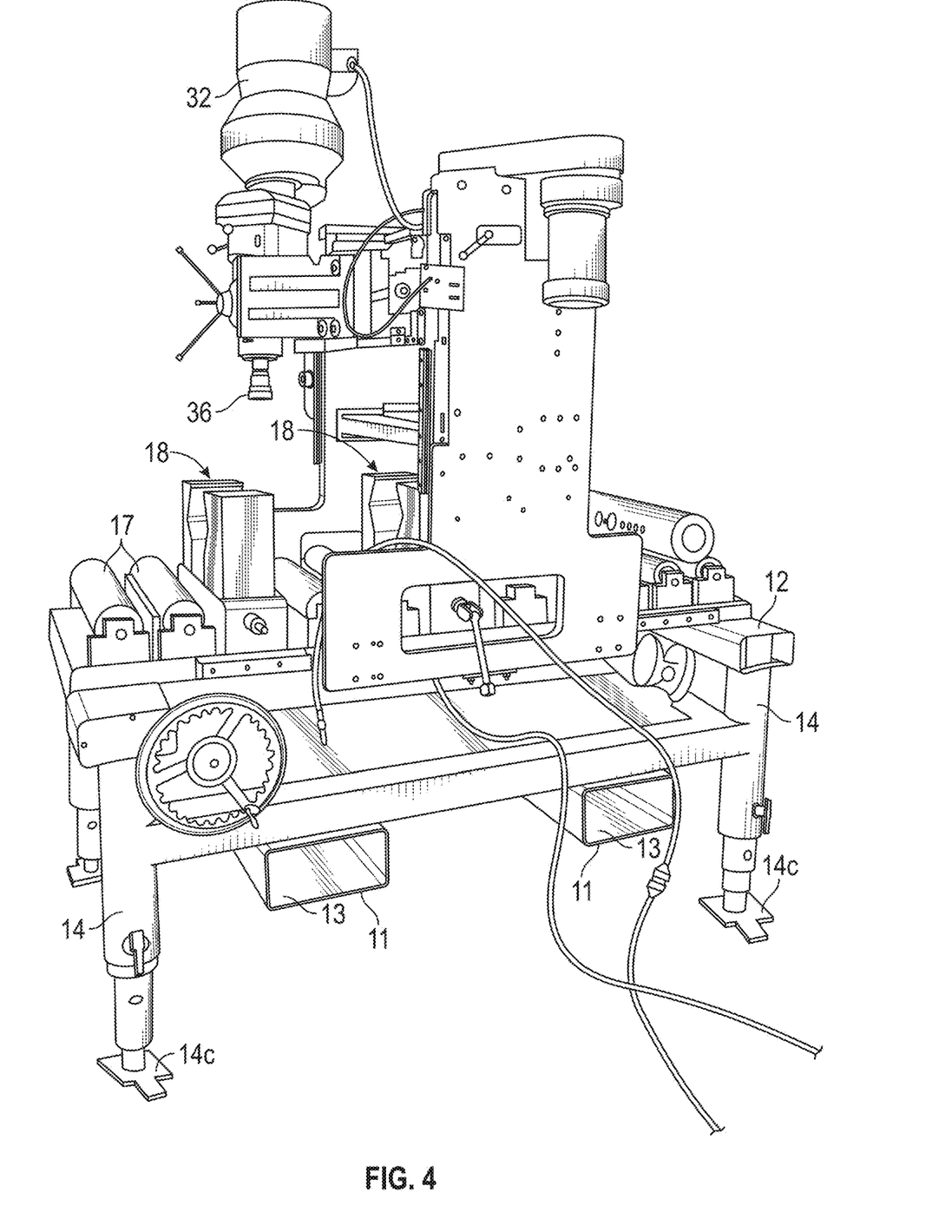
FIG. 4 is another perspective view of the milling machine of FIG. 1.
Figure 5:
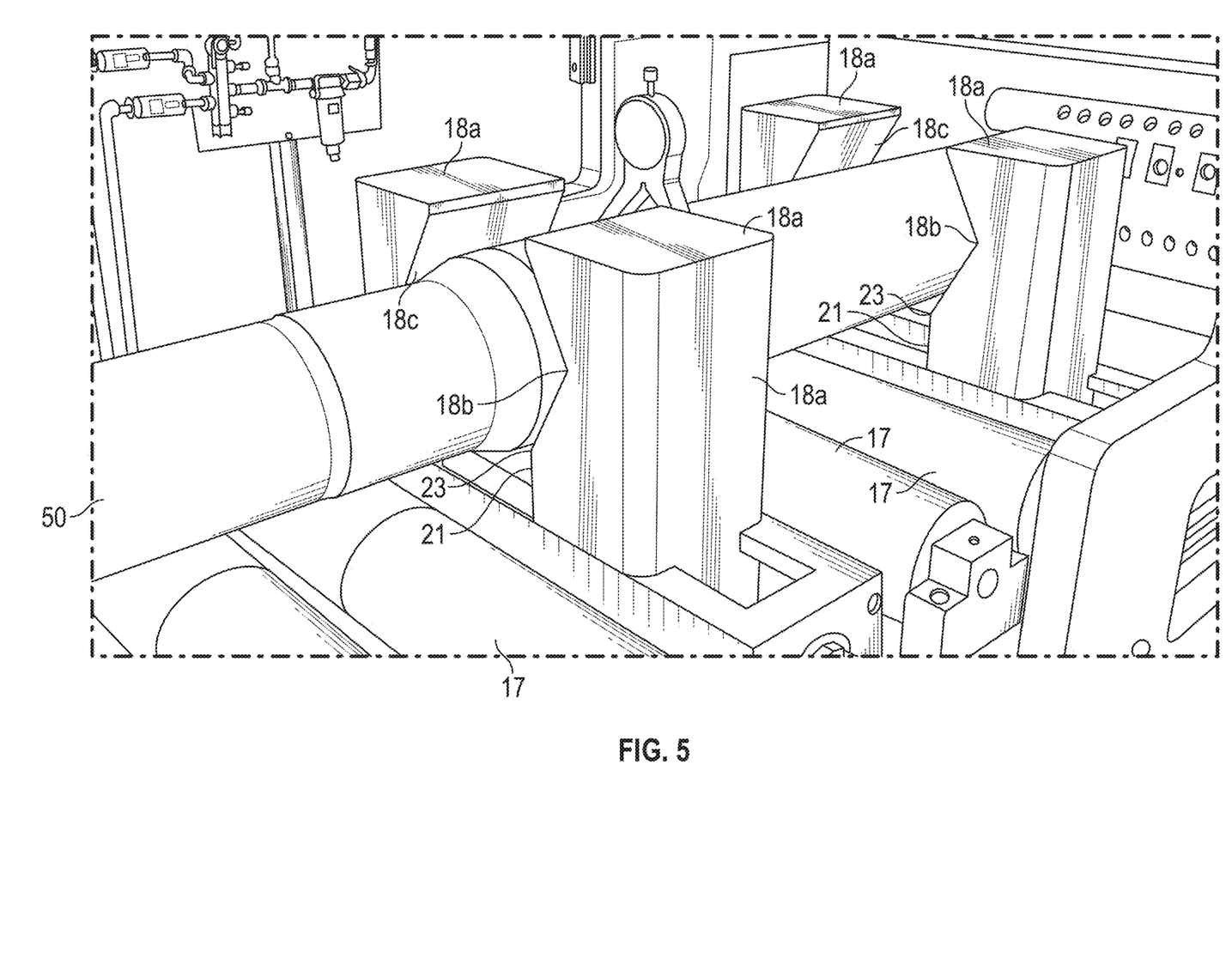
FIG. 5 is an enlarged perspective view of the machine of FIG. 1 showing, in particular, the vice member pairs in which a tubular member is secured.

Referring now to FIGS. 1-3, milling assembly 20 includes a frame 22 and a milling device 30 mounted to frame 22. Frame 22 includes a pair of vertical support plates 24 and one or more (e.g., a plurality) horizontal or lateral support members 26 extending or spanning between the support plates 24. Vertical plates 24 extend generally in the Z axis direction, whereas support members 26 extend in the Z axis direction. Support frame 22 is movably mounted to table 12 via a track assembly that includes a pair of support rails 28 coupled to table 12. Specifically, each support plate 24 includes a pair of sliders or track engagement members 25 that slidingly engage one of the support rails 28 and facilitate sliding movement of vertical support plates 24 (and thus support frame 22) along the table 12 in the X axis direction. A traversing mechanism 27 is mounted to table 12 and to vertical support members 24 and is configured to actuate movement of support plates 24 along the X axis direction shown in FIG. 2 (e.g., with a hand crank 27a and threaded rod 27b). In other embodiments, traversing mechanism 27 may utilize an electric, hydraulic, or other suitable powered mechanism for actuating movement of support frame 22 along table 12.

Milling device 30 includes a driver 32, an output shaft 34 operatively coupled to driver 32, and a milling tool 36 mounted to shaft 34. Driver 32 may be any suitable driver or motor such as, for example, a hydraulic motor, electric motor, internal combustion engine, etc. In this embodiment, driver 32 is an electric motor that is operatively coupled to shaft 34 such that operation of driver 32 actuates shaft 34 to rotate about an axis (not shown) that is parallel to the Z axis direction. One exemplary milling device 30 is a jet milling head, model number JTM4VS-HA, manufactured by Jet Tools.

Milling device 30 is movably mounted to frame 22 such that milling device 30 may be traversed along each of the Y axis and Z axis directions relative to frame 22. Specifically, milling device 30 is mounted to a sub-frame 31 that is mounted to vertical support plates 24 via a pair of tracks 37. A traversing mechanism 33, which in this embodiment includes a hand crank 33a and a threaded rod 33b, is mounted between sub-frame 31 and vertical support plates 24 and is configured to actuate movement of sub-frame 31 (and thus also milling device 30) along the Z axis direction relative to vertical support plates 24. In addition, another traversing mechanism 35 is coupled to sub-frame 31 to actuate movement of milling device 30 in the Y axis direction relative to sub-frame 31 along a pair of tracks 36 via a hand crank 35a and a threaded rod 35b. In other embodiments traversing mechanisms 33, 35 may be configured to induce or actuate movement of the sub-frame 31 and milling device 30 along the Z axis and X axis directions, respectively, with an electric, hydraulic, or other suitable powered mechanism.

As best shown in FIGS. 1-3, during operations, a tubular member 50 (e.g., pipe, downhole tool, casing, drill pipe, etc.) is fed into the milling machine 10 along the X axis direction (FIG. 2) by rolling engagement of the tubular member 50 and the rollers 17 of roller bed 16. Thereafter, the vice members 18a of the alignment vice assemblies 18 are actuated toward one another along the Y axis direction (shown in FIG. 1) until the opposing angled surfaces 18c on vice members 18a engage with the curved outer surface of tubular member 50. The relative angle of the opposing angled surfaces 18c ensures that tubular member 50 is generally centered between the vice members 18a on table 12. It should be appreciated that each of the alignment vice assemblies 18 may be actuated to engage with portions of tubular 50 that have different outer diameters. However, even in these scenarios, the relative angle of the surfaces 18c ensure that the tubular member 50 is generally centered between vice assemblies 18.

Figure 9A:
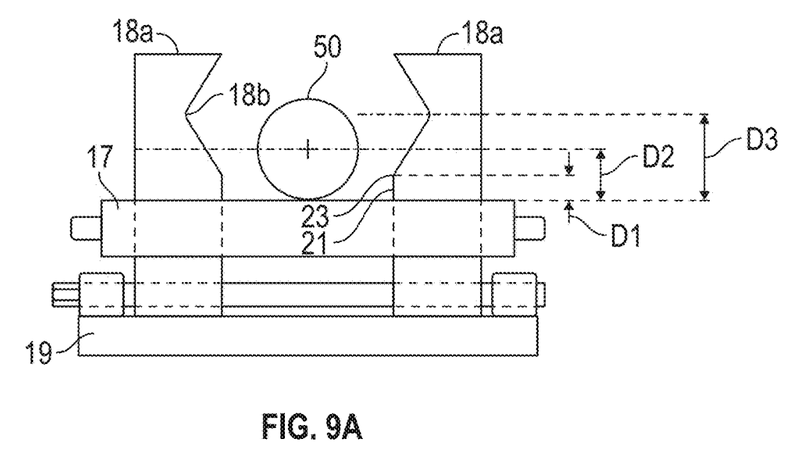
FIGS. 9A-9C are schematic, sequential, views of the vice assembly of FIG. 1 engaging, lifting, centering, and securing a tubular between the pair of vice members as the vice members move toward one another.
Figure 9B:
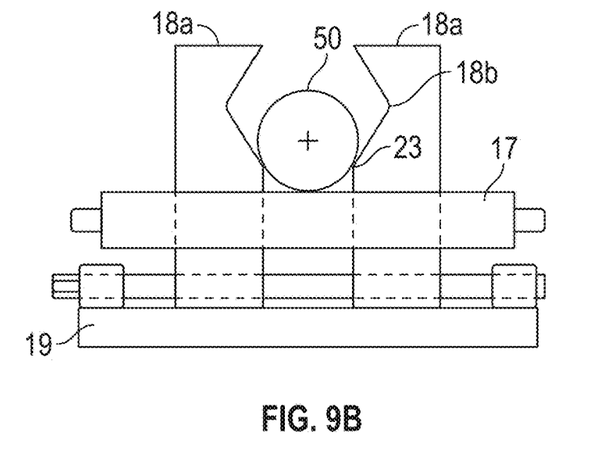
Figure 9C:
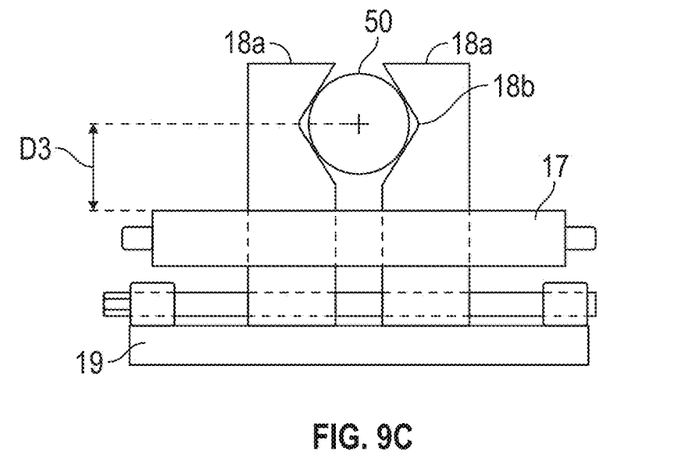

Referring now to FIGS. 9A, 9B and 9C, a pair of vice members 18a of one vice assembly 18 are shown in three sequential positions. In FIG. 9A, tubular 50 is shown resting on rollers 17 of roller bed 16 and positioned between vice members 18a. As shown in FIG. 9A, elbow 23 of each vice member 18a is at a fixed distance D1 above rollers 17 and roller bed 16, and the center of notch 18b is disposed at a fixed distance D3 above rollers 17. Further, in this embodiment, and with tubular 50 still resting on rollers 17 as shown in FIG. 9A, the centerline of tubular 50 is at distance D2 above roller bed 16. In this embodiment, D3 is greater than D2 and D2 is greater than D1. Before milling of tubular 50 occurs, vice members 18a are moved towards each other until they first engage tubular 50, the position shown in FIG. 9B. As vice members 18a continue towards one another, the lower surfaces 18c of each vice member 18a (the surfaces 18c closest to surface 21 and to rollers 17) act as cams, meaning that these lower surfaces 18c engage the OD of tubular 50 and bias it upward, causing the tubular 50 to slide and be lifted upward away from rollers 17. As vice members 18a continue to move towards one another, tubular 50 is urged upward and into notch 18b at the intersection of surfaces 18c on each vice member 18a, as shown in FIG. 9C. At that point, further upward movement of tubular 50 is prevented by the tubular's engagement with upper surfaces 18c. Once tubular 50 has been lifted into position within notch 18b, tubular 50 is secured in vice assembly 18 and held at a predetermined vertical distance D3 from rollers 17 and roller bed 16, a distance known and stored in the control system operating milling device 30. In this manner, no matter the diameter of tubular 50 that is retained in the machine 10, the center line of tubular 50 will be positioned at a known location before milling begins: centered within vice members 18a and held at the predetermined distance D3 above the rollers 17. Thereafter, milling device 30 is maneuvered into the desired position relative to tubular member 50 via manipulation of traversing mechanisms 27, 33, 35. Milling tool 36 and shaft 34 are rotated by driver 32 and the rotating tool 36 is engaged with the radially outermost surface of the tubular member 50 so that tool 36 may cut a designed surface, recess, or shape therein. For example, in some instances, tool 36 is advanced along the Z axis direction radially toward the center (or center axis) of tubular member 50 (e.g., via traversing mechanism 33) to form a recess (or threaded recess) for later receipt of an RFID tag. In these embodiments, tool 36 may be configured to both form the radial recess and cut (or tap) the internal threads within the recess in one single movement of tool 36, or alternatively, multiple tools (e.g., tools 36) may be used to cut or form the recess, and thereafter cut or form the internal threads within the formed recess. Alternatively, in some instances, the rotating tool 36 may be traversed in the Y axis or X axis direction (e.g., via the traversing mechanism 35 or traversing mechanism 27, respectively) to cut a substantially planar or flat surface along the otherwise curved (e.g., cylindrical, frustoconical, etc.) outer surface of tubular member 50. This flat surface may then be further cut or processed to bear identifying information (e.g., the flat surface may form an API mill slot).

During these operations, the driver 32 (or any other powered component on milling machine 10) may be operated either via generator power (e.g., such as would be available if the milling machine 10 were being operated at a remote work site), or by three phase power typically available within a machine shop or other facility. Further, the milling machine 10 may include one or more measurement devices (e.g., digital and/or analogue) that are configured to measure the position of the milling tool 36 during operations. For example, in some embodiment, the measurement devices may track the position of the milling tool 36 along one or more of the X, Y, or Z axes. The readings from at least some of these measurement devices may be displayed on a single monitor display or may be displayed on multiple monitors.

Milling machine 10 replaces the need for existing commercial CNC machine options that require special environments (e.g., shop buildings with level flooring, clean work areas, and strategically positioned racks and lifting devices). Milling machine 10 does not require temperature control or clean environments and will work at various sites in more adverse climates and on uneven terrains. Conventionally, without milling machine 10, the product pieces to be milled had to be removed from their inventory or job site (lay down yards, drilling rigs, etc.) and transported to a machine shop, one having a controlled environment with special lifting device and other apparatus in order to complete the slot/recess machining and pocket threading. By contrast, milling machine 10 allows product parts to be machined on site, and they need not to be transported from inventory at a job site (e.g. a drilling site) to a distant shop site, thereby saving significant handling and transportation costs. The legs (e.g., legs 14) are individually adjustable to any terrain. The individual feet (e.g., feet 12c) are adjustable to allow for fine stability adjustments to resolve even minor variances in terrain.

Additionally, milling machine 10 is smaller than a conventional CNC, which allows it to be portable. The machine has forklift slots (e.g., lifting members 11 with receptacles 13) so that machine 10 is easily lifted, moved and transported. Conventional CNC machines do not have these features, and are not designed to be portable.

The milling machine 10 receives product by a roller system (e.g., roller bed 16). This is advantageous because it simplifies lifting of heavy components. The rollers (e.g., rollers 17) allow the operator to guide the component, such as a length of tubular drill pipe or casing, as examples, that traditionally required an overhead (or similar) lift and racks in order to correctly center and position the part (another reason parts are typically transported to machine shops where lifting mechanisms and rack systems are typically positioned to compliment the static traditional CNC machine). Conventionally, without milling machine 10, it has been difficult to develop a lifting system that can be easily transportable; the rollers (e.g., rollers 17) eliminate the need for the final manual placement of the component that is to be machined, thereby increasing efficiency.

The vice members 18a of assemblies 18 are self-centering. Thus, two vice assemblies 18 can engage, clamp and secure a tubular member or an assembly of tubulars having portions with two different diameters along the length (for example, a box end of a tubular that has an OD greater than the OD of a central portion of the tubular assembly), which allows centering of the tubular assembly to remain even though the machine is attached to differing sized portions of pipe assemblies. Without other modification, milling machine 10 thus described will accommodate drill pipe inventory of 4.5 inches to 11 inches in diameter. For vice members 18a to accommodate this entire range of OD, vice member 18a should be formed and coupled to base 12 such that distance D1 (FIG. 9A) is not greater than 2.25 inches (one half of the diameter of the smallest tubular 50 being lifted and secured). For smaller pipe diameters, such as 2⅜ inches to 4.5 inch, shoe 60a,b may be attached to each vice member 18a.

Figure 10:
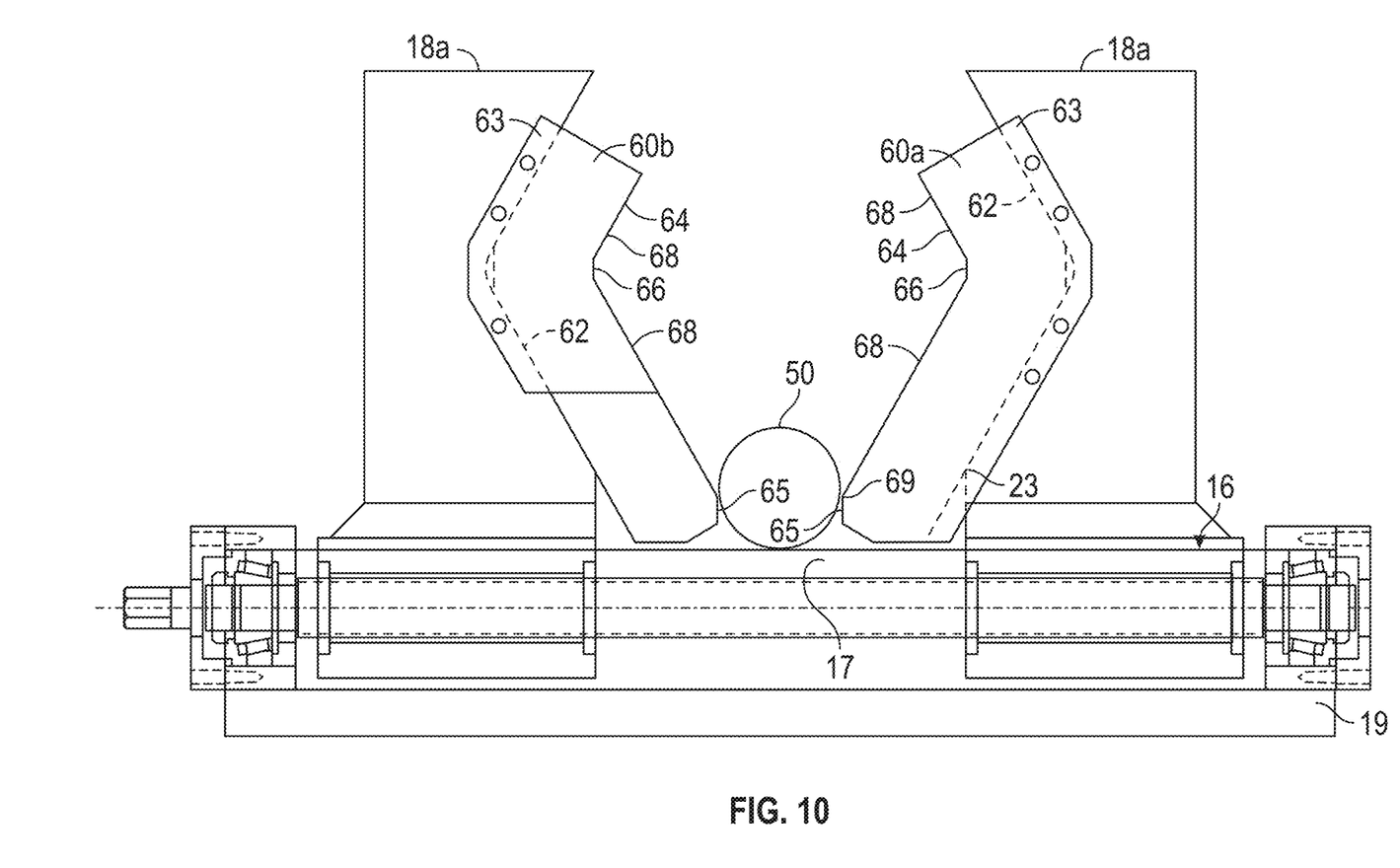
FIG. 10 is an elevation view showing a shoe attached to each of a pair of vice members so as to permit the vice assembly to engage, lift and secure smaller diameters tubulars.

More specifically, and referring to FIG. 10, each shoe 60a,b includes a rear facing surface 62 that engages surfaces 18c and 21 of a vice member 18a, a front, pipe-engaging surface 64 for engaging a tubular 50, and sides or flanges 63. A shoe 60a,b may be attached to each vice member 18a by bolts (not shown) that extend through aligned bores formed in flanges 63 and vice members 18a.

Pipe-engaging surface 64 of shoes 60a, b includes a v-shaped notch 66 formed by the intersection of a pair of opposed angled surfaces 68. In this embodiment, the angle between the angled surfaces 68 of each shoe 60 is approximately 120°; however, other angles are possible in other embodiments. Each shoe 60 further includes a lower surface 65 that is below angled surfaces 68 and that, in this embodiment, is generally perpendicular to roller bed 16 and table 12. Lower surface 65 intersects the lowermost angled surface 68 forming elbow 69. In use, a shoe 60a,b is attached to each vice member 18a as shown in FIG. 10.

Figure 11A:
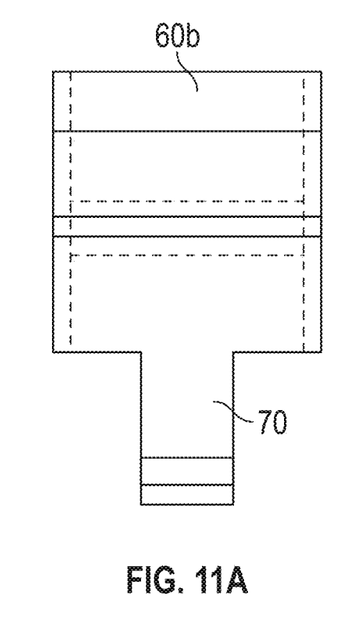
FIGS. 11A-C are, respectively, front, side and rear elevation views of one of the shoes shown in FIG. 10.
Figure 11B:
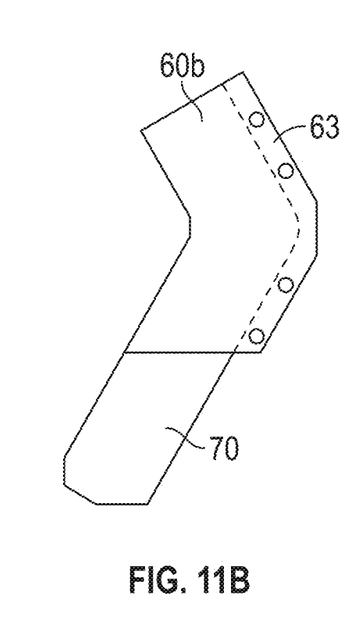
Figure 11C:
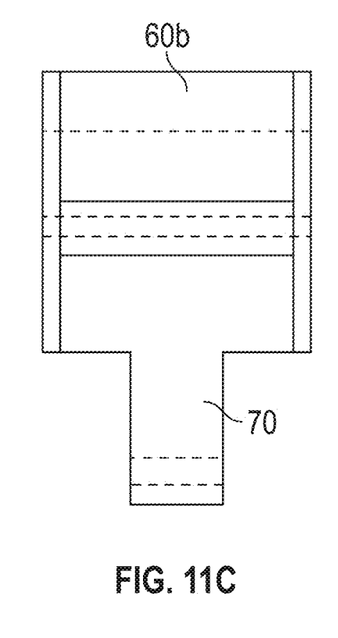
Figure 12A:
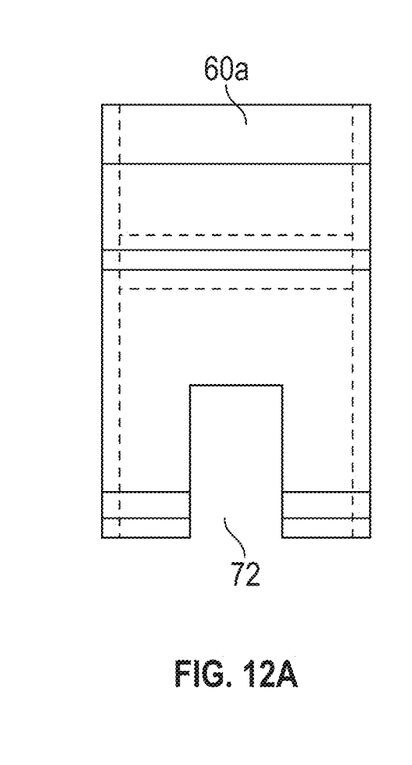
FIGS. 12A-C are, respectively, front, side and rear elevation views of the other of the shoes shown in FIG. 10.
Figure 12B:
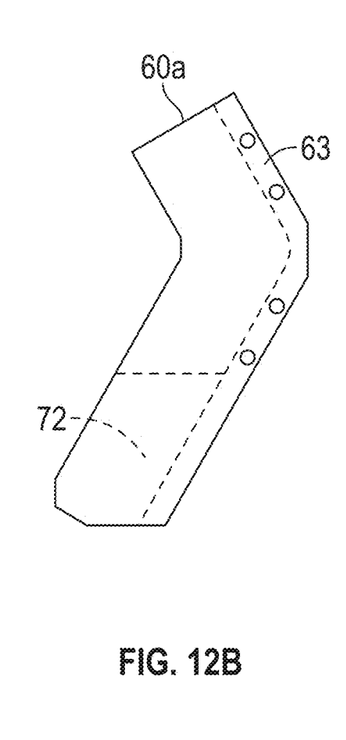
Figure 12C:
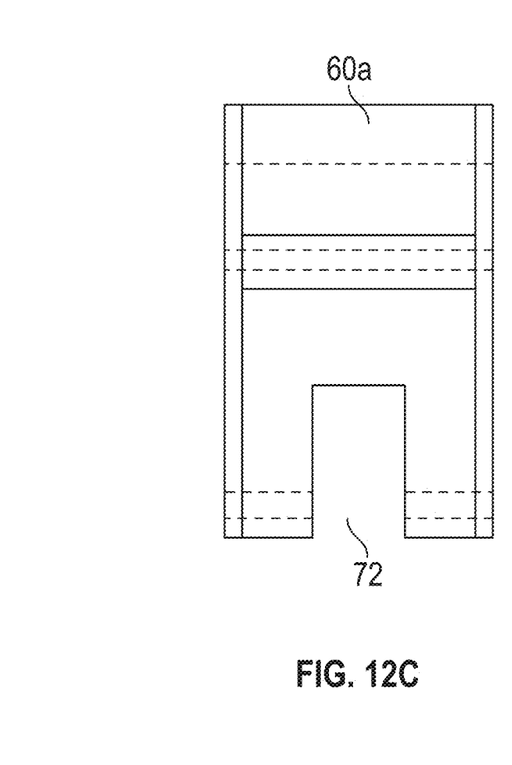
Figure 13:
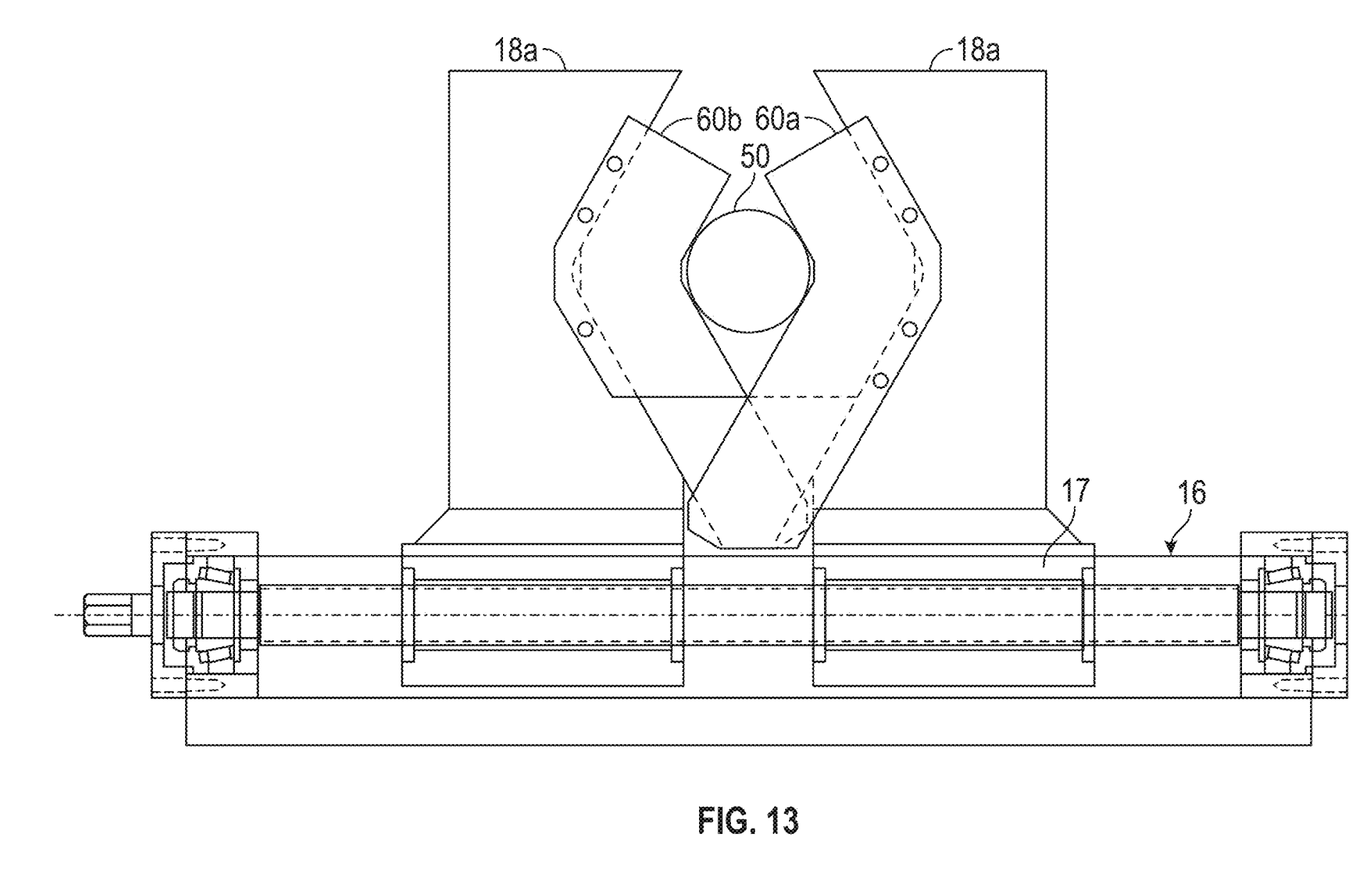
FIG. 13 is an elevation view showing the intermeshing of the shoes of FIG. 10 that occurs when the vice members have moved so as to lift the tubular off of the roller bed.

Referring momentarily to FIGS. 11 and 12, shoes 60a, b have some differences. As shown in FIGS. 11A-C, shoe 60b includes a downwardly extending and angled leg portion 70. Shoe 60a (FIGS. 12A-C) includes a receiving slot 72 sized to receive leg 70 as vice members 18a and their attached shoes are moved toward one another. Referring now to FIG. 13, when vice members 18a are moved toward one another, angled surfaces 68 of the shoes 60a,b act as camming surfaces against tubular 50 and engage, lift, and secure tubular member 50 in position in notch 66 as shown in FIG. 13 for being machined. As the shoes 60a,b get close to one another, leg 70 is received in slot 72 and the vice members 18a are therefor permitted to come together enough so that shoes 60a,b lift the tubular 50 all the way to the position shown in FIG. 13 without shoes 60a,b otherwise contacting one another and causing interference. The use of shoes 60a,b permit smaller diameter tubulars to be grasped, lifted and secured by vice assembly 18 than would be the case using vice members 18a without shoes 60a,b. In part, this is because shoes 60a,b include camming surfaces 68 that extend down to elbow 69 which is at a position closer to the rollers 17 than is the elbow 23 of vice members 18a to which the shoe is attached. In this manner, milling machine 10 may be employed to form pockets or slots on all sized pipe typically present on a conventional drilling site (e.g., tubulars having OD's from 2⅜ in. to 11 in.).

The milling machine 10 may be energized from a single or three phase electrical connection. The single phase allows portability and connection to a generator; the three phase allows shop power. This allows flexibility in power supply and portability to and from international yard sites and shop sites.

The milling machine 10 resolves present-day difficulties in milling RFID recesses and threaded pockets in pipe assemblies. It resolves the high cost of transporting product from sites to machine shops, as it is portable and will operate on site, where the inventory is located. It combines two traditional separate machine operations (e.g., the slot and recess milling, and the threading operation) into a single machine operation.

It has been traditionally difficult to bring existing inventory at various sites to a shop to complete the milling and threading. This portable machine 10 brings the milling and threading operations to the inventory site.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A milling machine, comprising:
   a base;
   a plurality of legs configured to support the base, wherein each of the legs has a length that is adjustable;
   a milling assembly coupled to the base, the milling assembly including a milling tool rotatable by a driver;
   a plurality of rollers coupled to the base for supporting a tubular member to be machined by the milling tool;
   a vice assembly coupled to the base and including a pair of vice members, each vice member configured to be moved towards the other of the pair and including a v-shaped notch formed by a pair of angled surfaces, wherein the vice assembly is configured to lift the tubular member off of the rollers in response to the vice members being moved toward one another.

2. The milling machine of claim 1 wherein each vice member of the pair is coupled to the base such that, when the tubular member is supported by the rollers, the distance from the rollers to the notch is greater than the distance from the rollers to the centerline of the tubular member.

3. The milling machine of claim 2 wherein each vice member of the pair includes an elbow spaced apart from the notch, and wherein each vice member of the pair is coupled to the base such that, when the tubular member is supported on the rollers, the notch is positioned further from the rollers than the elbow.

4. The milling machine of claim 3 wherein, when the tubular member is supported on the rollers, the distance between the rollers and the elbow is less than the distance between the rollers and the centerline of the tubular member.

5. The milling machine of claim 1 wherein each vice member of the pair is coupled to the base such that, when the tubular member is retained within the notch, the tubular is supported a predetermined distance away from the rollers.

6. The milling machine of claim 1, further comprising a plurality of lifting members coupled to the base, each of the plurality of lifting members including a receptacle that is configured to receive an appendage of a lifting device; and wherein the lifting device is configured to lift the milling machine and the base.

7. The milling machine of claim 1, wherein the milling assembly comprises a frame that is configured to traverse along the base in a first direction.

8. The milling machine of claim 7, wherein the milling assembly further comprises a sub-frame configured to support the milling tool, wherein the sub-frame is movably coupled to the frame such that the sub-frame may traverse relative to the frame along a second direction that is orthogonal to the first direction.

9. A milling machine, comprising:
   a base;
   a milling assembly coupled to the base, the milling assembly including a milling tool rotatable by a driver;
   a roller bed coupled to the base and configured to support a tubular member on a plurality of rollers, including a first roller; and
   a vice assembly coupled to the base and comprising a first vice spaced apart from a second vice, wherein the first roller is positioned between the first vice and the second vice, and wherein each of the first vice and second vice includes a pair of vice members, each vice member configured to be moved towards the other of the pair and including camming surfaces configured to lift the tubular member off of the roller bed in response to the vice members being moved toward one another.

10. The milling machine of claim 9 wherein each of the pair of vice members comprises a v-shaped notch defined by a pair of angled surfaces.

11. The milling machine of claim 10 wherein the vice assembly is configured to lift any tubular member having an OD of 2⅜ inches to 11 inches to the position that is the predetermined distance away from the roller bed.

12. The milling machine of claim 10 wherein the vice assembly is configured to lift any tubular member having an OD of 4.5 inches to 11 inches to the position that is the predetermined distance away from the roller bed, and wherein each vice member of the pair includes an elbow spaced apart from the notch, and wherein each vice member of the pair is coupled to the base such that the elbow is not greater than 2¼ inches from the roller bed.

13. The milling machine of claim 12 further comprising a shoe coupled to each vice member, the shoe comprising a camming surface that extends to a position that is closer to the rollers than the camming surfaces of the vice members.

14. The milling machine of claim 13 wherein a first shoe comprises a leg and a second shoe comprises a slot, and wherein the leg is confirmed to operatively slide within the slot when the vice members are moved toward one another to lift the tubular member.

15. The milling machine of claim 9 wherein the vice assembly is configured to lift the tubular member and retain it at a position that is a predetermined distance away from the roller bed.

16. The milling machine of claim 9 further comprising a plurality of hollow lifting members coupled to the base, each of the plurality of lifting members extending at least half of the width of the base and including a receptacle that is configured to receive an elongate appendage of a lifting device.

17. A method of machining a pocket in a surface of a tubular member, comprising:
    placing a tubular member in contact with a plurality of rollers on a roller bed that is supported on the base of a milling machine;
    moving towards one another a pair of vice members that are coupled to the base, wherein each of the vice members include a notch formed by the intersection of two angled surfaces;
    as the vice members are moving towards one another, causing an angled surface of each of the vice members to engage the tubular member and lift the tubular member off of the rollers;
    capturing the tubular member and retaining it at a predetermined distance from the roller bed;
    after capturing the tubular member, machining a pocket in the tubular member with a milling tool supported from the base.

18. The method of claim 17 further comprising:
    prior to moving the pair of vice members towards one another, attaching to each of the vice members a shoe, the shoe comprising a camming surface that extends to a position that is closer to the rollers than the angled surfaces of the vice members.

19. The method of claim 17 further comprising:
    prior to placing the tubular member on the roller bed, leveling the base by adjusting the length of legs that are coupled to the base.

20. The method of claim 19 further comprising:
    prior to leveling the base, positioning appendages of a lifting device within a plurality of hollow lifting members that are coupled to the base, and lifting the milling machine using the appendages.

* * * * *